(No Model.)
P. SCHARF.
INCANDESCENT ELECTRIC LAMP.
No. 480,284. Patented Aug. 9, 1892.
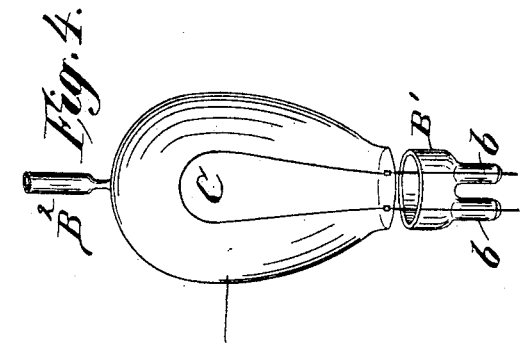
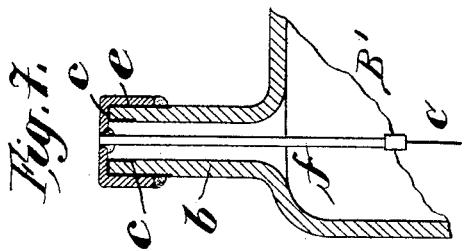
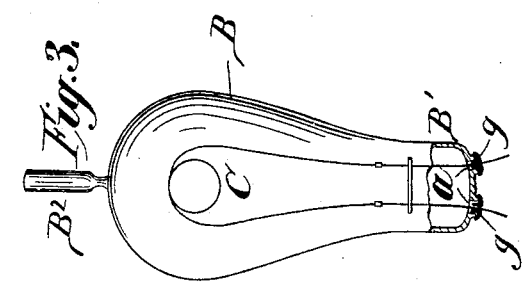
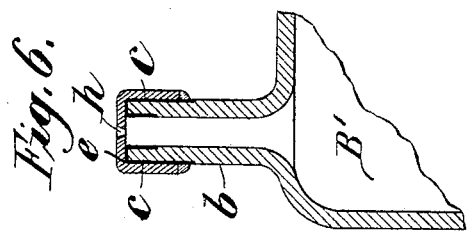
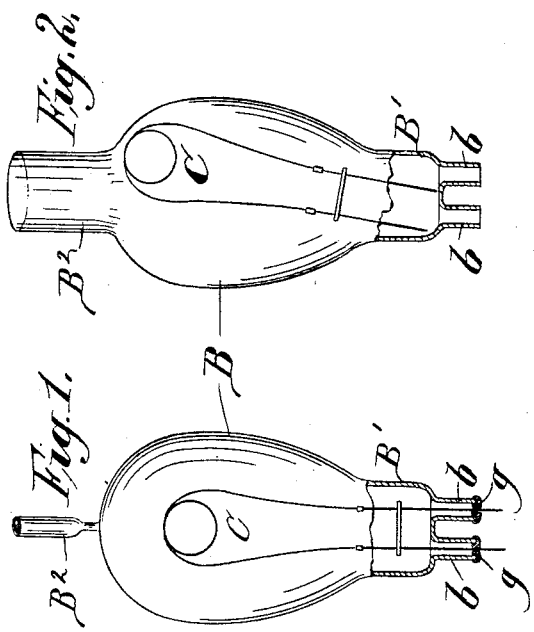
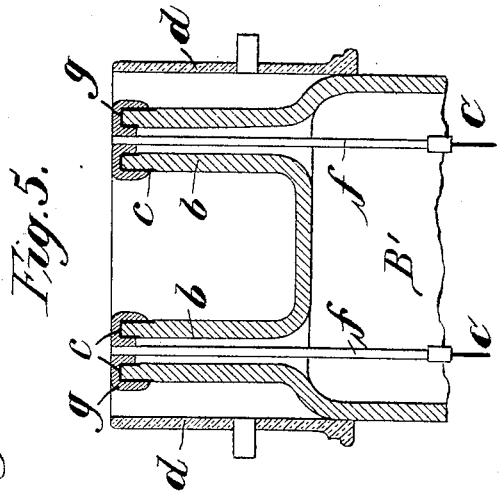
Witnesses:
H. J. Dieterich
C. W. Sommers
Inventor:
Paul Scharf
By _____ Atty.
THE NORRIS PETERS CO., PHOTO-LITHO., WASHINGTON, D. C.

UNITED STATES PATENT OFFICE.

PAUL SCHARF, OF VIENNA, AUSTRIA-HUNGARY, ASSIGNOR OF ONE-FOURTH TO RUDOLF LATZKO, OF SAME PLACE.

INCANDESCENT ELECTRIC LAMP.

SPECIFICATION forming part of Letters Patent No. 480,284, dated August 9, 1892.

Application filed August 7, 1891. Renewed July 1, 1892. Serial No. 438,707. (No model.)

*To all whom it may concern:*

Be it known that I, PAUL SCHARF, a subject of the Emperor of Austria-Hungary, residing at Vienna, in the province of Lower Austria, in the Empire of Austria-Hungary, have invented certain new and useful Improvements in Electric Incandescent Lamps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to electric and incandescent lamps, and has for its object the provision of means whereby the costly platinum connections between the carbon or other filament and the electrode or poles of the lamp are dispensed with.

The invention consists in structural features and combinations of parts, as will now be fully described, reference being had to the accompanying drawings, in which—

Figures 1 to 4 are elevations illustrating my invention, and Figs. 5 to 7 are sectional detail views drawn to an enlarged scale.

In the construction of electric incandescent lamps platinum has been exclusively used as a means for supporting the filament or other incandescing body within the lamp and for connecting the same with the electric circuit. The use of platinum, as is well known, forms an important factor in the cost of the lamp, and various attempts have been made to dispense with this costly metal. So far as I am aware none of these attempts have proven successful, by reason of the unequal expansion of the substitute for the platinum and the glass or other envelope to which said substitute is secured, thereby preventing a tight joint being formed between the two. Furthermore, in uniting the cheaper metal to the lamp by means of heat, as has been the case heretofore, the formation of oxides could not be prevented, so that a tight joint could not be obtained by reason of this formation of oxides. Finally, in effecting the junction of the metallic substitutes for the platinum with the lamp by means of heat the temperature necessary is sufficient to melt or destroy the substitutes. These difficulties are effectually avoided by my invention, so that I am enabled to use the baser metals—such as copper, iron, &c.—in lieu of platinum with all the advantages hitherto considered peculiar to the last-named metal.

In carrying out my invention the glass bulb B has its neck closed and provided with suitable passages for the passage of the supporting and conducting wires for the carbon filament or other incandescing body C. The passage may be formed by simple apertures *a*, Fig. 3, or by tubular extensions or legs *b*, Figs. 1 and 2 and Figs. 4 to 7.

In order to admit of the introduction of the incandescing body C and its supporting and conducting wires *f*, a tubular extension $B^2$, Fig. 2, may be formed on the bulb diametrically opposite the neck B′, said extension $B^2$ being afterward reduced to an exhaust-tube, Figs. 1, 3, and 4, and finally closed after the necessary vacuum has been formed in the bulb; or said bulb may be constructed in two parts, the neck B′ forming one of the parts, which neck B′ may be welded to the bulb B after the incandescing body and its conductors have been secured in said neck.

The mode of securing the metallic conductors *f* within the neck is as follows: The passages *a* or *b* for the conductors *f* are first metallized with a precious metal, such as silver, gold, or platinum, and in the process of metallization the precious metal may be used in the form of a metallic powder or a chemical combination, and in either case I prefer to combine therewith a volatile oleaginous or resinous body—as, for instance, oil of camomile, or turpentine, or resin, Canada balsam, or copaiba-balsam, or resin-oil, or any other oleaginous or resinous body adapted to be completely volatilized by heat and to form a paste when combined with the precious metal, so that when so volatilized the metallic body will alone be in contact with the glass. I prefer to use metallic gold or silver in the form in which these metals are generally employed in the ornamentation or decoration of porcelain, and I apply said metals to the apertures *a* or tubular extensions *b*, both within and without, as shown at c, Figs. 3, 5, 6, and 7, in a manner similar to that resorted to in metallizing porcelain by "burning in."

In practice I have obtained excellent results with silver, which in the form of a fine metallic powder I mix with an essential or vaporizable oleaginous body or with a vaporizable resinous body, such as above mentioned, preferably Canada or copaiba balsam, to form with the silver a cream-like body, which I apply to the openings a or to the tubular extensions or legs b by means of a brush or otherwise, and then burn it in. In the latter operation some care should be exercised as to the degree of heat applied, as I have found that if the temperature is too high or too prolonged the metallic deposit is liable to granulate or become nodulous or non-continuous, while if the temperature is too low the metallic coating does not adhere sufficiently to the glass. I have also found that the best results are obtained by keeping the parts coated with the metal in motion during the burning in—as, for instance, by revolving the bulb. The parts after being coated with the metallic compound are allowed to thoroughly dry before burning the metal in, and in this operation care should be had to vaporize or burn out all of the balsam.

Should it be found that the metallic deposit is insufficient to form a good conductor of electricity, the operation may be repeated until a satisfactory coating or deposit is obtained.

But little practice is required for the performance of the operation of metallizing the bearings for the conductors of base metal, and when so metallized they are ready for the reception and connection of said conductors, and this operation may be effected by the ordinary method of soldering or by electrolytic deposition of a sealing metal, whereby a tight joint is obtainable. The carbon filament or other incandescing body having been secured to its conductors of base metal—as, for instance, copper or iron wire f—and introduced into the bulb B, as above described, with the conductors f extending through their bearings a or b, I secure them by either of the above methods. I prefer, however, to resort to the soldering process for this purpose, as it is not only the cheapest, but the most convenient and expeditious means of securing the wires f in their bearings. I use a soft or tin solder applied, in the usual way, by means of a soldering-iron and a suitable flux or soldering fluid. This operation should be performed as rapidly as possible, for the reason that a homogeneous body of solder and a perfectly-tight joint are more readily obtained thereby. In Fig. 5 the body of solder applied to the tubular bearings or legs b is shown at c. In this figure I have shown the lower part of a lamp, in which the electrodes are arranged for use with the well-known bayonet-joint holder, the brass coupling-sleeve d being cemented, as usual, to the neck B' of the lamp by means of a plaster-of-paris or other insulating cement.

In order to more effectually protect the tubular bearings b against accidental breakage, and also to provide means for connection of electrical conductors, I solder to the end of said legs a metallic cap e, preferably of copper, as shown in Figs. 6 and 7, which may completely close the end of the bearings b when said caps are used as electrodes; or they may be provided with an opening h for the conductor f, which may be cut off at that point, as shown in Figs. 5 to 7, or may extend therefrom to any degree for connection with electrical conductors or other lamp-fittings, according to the conditions of use of the lamp.

Instead of soldering the cap to the metallized portion of the bearings b, the said cap may be firmly joined therewith by an electrolytic deposit of a conducting metal.

Of course I do not desire to limit this invention to the mode of introducing the incandescible body into the bulb, as this may be varied, as hereinbefore set forth, or in other ways that may be found more convenient or advantageous, or according to the particular uses made of the lamp or the particular fittings therefor. It will be observed, however, that whatever method may be resorted to in the formation of the bulbs or the introduction thereinto of the incandescible filament or body the latter is invariably and directly connected with a support and conductor of a base metal of such length as to extend to its electrode or other electrical connections or terminals.

I not only dispense with the use of platinum, but also avoid the labor and expense of making the filament-supports of a plurality of sections, as is the case in some lamps, one of said sections—namely, that which extends through the neck of the bulb—being made of platinum.

Having thus described my invention, what I claim as new therein, and desire to secure by Letters Patent, is—

1. An incandescent lamp consisting of a bulb B, provided with a neck B', having two tubular bearings b, metallized, as set forth, an incandescible body, and supporting and conducting wires therefor, soldered to the metallized surfaces of the said bearings, as and for the purpose set forth.

2. An incandescent lamp consisting of a bulb B, provided with a neck B', having two tubular bearings b, metallized, as set forth, an incandescible body, supporting and conducting wires therefor, soldered to the inner metallized surfaces of said bearings, and the metallic cap e, soldered to the outer metallized surface of the bearings, as and for the purpose set forth.

3. An incandescent lamp consisting of a bulb B, provided with a neck B', having two tubular bearings b, metallized, as set forth, an incandescible body, supporting and conducting wires therefor, said wires being made of a base metal, such as copper, iron, &c., and soldered to the inner metallized surfaces of said bearings, and the metallic cap $e$, soldered to the outer metallized surface of the bearings, as and for the purpose set forth.

In testimony whereof I affix my signature in presence of two witnesses.

PAUL SCHARF.

Witnesses:
W. B. MURPHY,
A. YOHLESSING.